Aug. 8, 1939.　　　　P. PFUNDT　　　　2,168,943

METHOD FOR UNITING FUSIBLE CRYSTALLINE BODIES

Filed Oct. 13, 1938

INVENTOR.
PAUL PFUNDT
BY G. G. Christensen
ATTORNEY.

Patented Aug. 8, 1939

2,168,943

UNITED STATES PATENT OFFICE 2,168,943

METHOD FOR UNITING FUSIBLE CRYSTALLINE BODIES

Paul Pfundt, Kiel, Germany, assignor to The Brush Development Company, Cleveland, Ohio, a corporation of Ohio Application October 13, 1938, Serial No. 234,806
In Germany February 26, 1937

7 Claims. (Cl. 171—327)

This invention relates to a method for uniting crystalline bodies of piezo-electric material by means of a fusion joint, and particularly relates to the joining of a plurality of crystalline plates into a unit having the various plates firmly and integrally bonded to each other.

It is an object of this invention to avoid the use of adhesive and cementing material in the fabrication of multiple plate piezo-electric units. It is a further object to provide a method whereby a strong joint may be formed which will withstand the severe twisting, bending and shearing strains developed in multiple plate piezo-electric units during use.

In the past, it has been customary to build such multiple plate units as are described in the Sawyer Patents Reissue 20,213 and Reissue 20,680 and in the Williams Patent 2,105,011 by cementing the various elements together. Various disadvantages have attended the use of cements or adhesives, the chief one of which has been the large amount of breakage caused by the high pressures required to squeeze the excess adhesive out from between the crystalline elements. This disadvantage has been especially objectionable when very thin elements have had to be cemented together since these thin crystals are already so fragile that even with the most careful handling only a small percentage may be squeezed together in this manner without breaking.

Now my invention makes it possible to avoid the use of cements and adhesives, and thereby to eliminate the above mentioned disadvantages. According to my invention, a fused autogenous joint is made between the parts to be assembled, and when properly and carefully made, this type of joint forms an integral part of the assembly and is amply strong to resist the various stresses developed during use in piezo-electric devices.

The simplest manner of practising the invention consists in holding a pair of the crystalline elements in face to face contact while a heated tool similar to a soldering iron, but having a finer tip, is passed quickly over the edges of the contacting faces. The heat thus conducted to the edges causes them to fuse and run together so as to form a fused joint between the elements. Since a joint formed in this manner is integrally attached to both elements and since it is composed of the same material as that of the elements, it is practically as strong and flexible as the crytalline elements themselves, and accordingly is eminently suitable for use in the flexing-type multiple plate piezo-electric units.

It is pointed out that a little care and caution should be exercised in practising this method especially when crystals of Rochelle salt are so joined. While Rochelle salt melts at a fairly low temperature (around 85 degrees centigrade), it has a rather high coefficient of thermal expansion with a relatively low coefficient of thermal conductivity. Because of this latter combination of properties, if too much heat is applied in a localized area during fusion the excess heat will not be conducted away by the adjoining areas fast enough to avoid sharp temperature gradients and their accompanying differential expansions, with the result that the crystal generally cracks. However, a little skill obtained through practise soon makes it possible for the operator to move the heated tool at the proper speed to just fuse the surface portions and make the desired joint without applying so much heat as to crack the crystals by expansion. In this way a good joint can be made without harming the crystal or adversely affecting its piezo-electric properties.

Various modifications and extensions of this basic method are of course possible without departing from the invention. Several such modifications are shown in the drawing, and reference is now made to them in order to explain the invention more fully.

Figure 1:
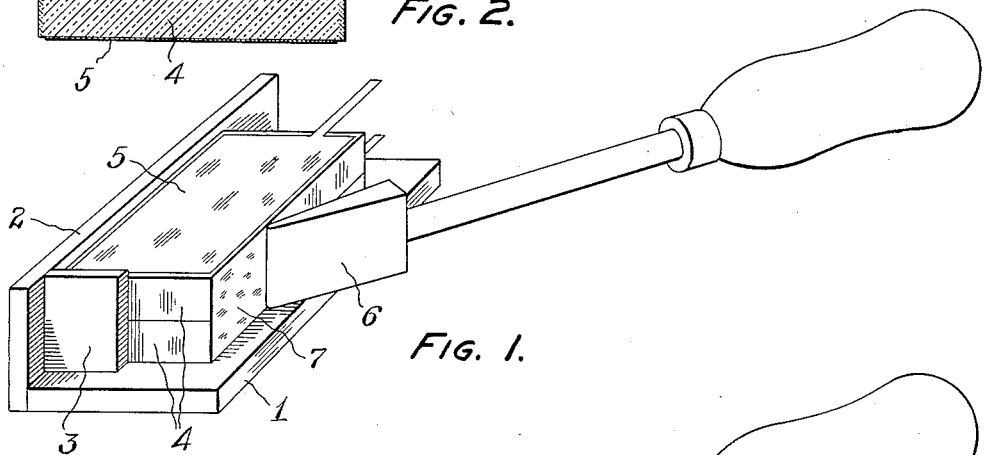
Fig. 1 represents one form of support and tool suitable for joining the edges of two crystalline plates.

Referring now to Fig. 1, a method is illustrated for fusing the entire face areas adjacent to the edges which are desired to be joined. A base is provided which consists of a support 1, a back-up plate 2 and a butting plate 3. A pair of crystalline plates 4, 4 either with or without electrodes 5, 5 (see Fig. 2) on opposite faces, are positioned on the support and aligned vertically by forcing them against the backing and butting plates 2 and 3 respectively. A tool 6 is provided which has a tip wide enough to extend across substantially both edge faces when rested or guided upon support 1, all as shown by the figure. In using this device, the crystals are forced into the corner formed by plates 2 and 3 and are there firmly pressed together upon support 1. Tool 6, having been heated substantially above the melting point of the crystalline material to be fused, is rested upon support 1 and pressed lightly against the crystal edges until fusion begins. It is then guided upon the support 1 and moved along the crystalline faces at such a rate that fusion occurs across the whole face. The fused surface 7 is then allowed to cool and solidify, and may be aided by means of a blast of air. The process is then repeated on each of the other three sides of the assembly.

Figure 2:
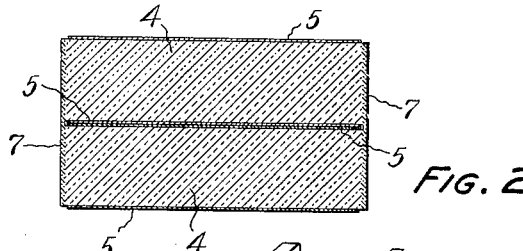
Fig. 2 shows a cross-sectional view of a biplate assembly as made by the method of Fig. 1.

Fig. 2 shows the effect of the action described above. A fused face 7 extends across substantially the whole edge of the composite assembly which face, being integrally fused to the body of each plate, firmly joins them together. Electrodes 5, 5 are shown, but it will be obvious to those skilled in the art that they may be omitted since some well known uses of piezo-electric crystals require no electrodes attached to the materials.

Figure 3:
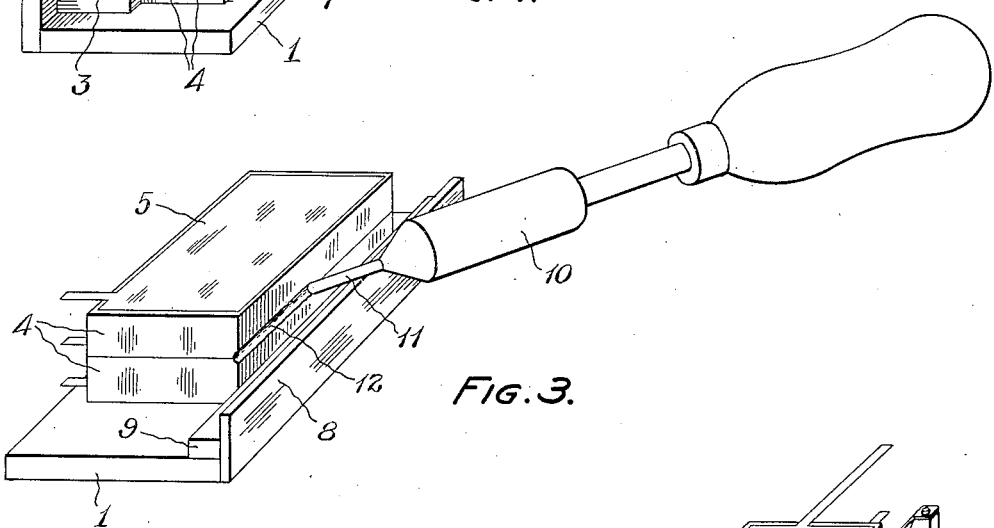
Fig. 3 represents a form of support and tool suitable for fusing only those portions of two plates which lie adjacent the desired seam or joint.
Figure 4:
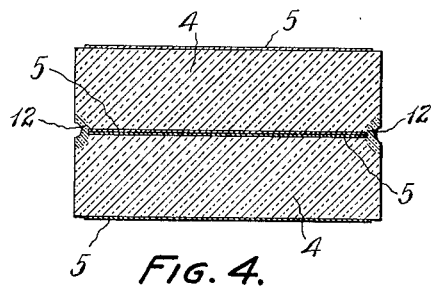
Fig. 4 shows a cross-sectional view of a biplate assembly as made by the method of Fig. 3.

Fig. 3 illustrates another modification for joining the plates together. Here a support 1 is provided with a guide plate 8 and a spacer 9 mounted thereon. A butting plate as shown in Fig. 1 may also be provided. The guide plate 8 is chosen to have a height above the upper surface of support 1 which corresponds closely to the thickness of one of the crystalline plates. The spacer, 9, is provided so as to prevent fused salt from running on to guide plate 8 during the joining step. A tool having a fairly large body 10 and a needle-like point 11 is provided, a large body portion being used so that its heat will help to hold point 11 at a more uniform temperature. In use, two crystal plates having substantially the same dimensions are positioned with their faces together and are aligned vertically so as to form flat edge faces. This assembly is held firmly against spacer 9 and upon support 1, while the tip 11 of heated tool 10 is moved upon the uper edge of plate 8 so as to be guided along the joint between plates 4, 4. The small tip which is used fuses the crystalline material adjacent to the joint and, as it is moved along, leaves a narrow band 12 of fused salt which solidifies to join the two plates together. The cross-sectional view of Fig. 4 shows this fused band more clearly. It will be seen that the fused joint extends more deeply into the assembly than where the whole face is fused, as in Fig. 1. This type of joint often leaves a rough surface adjacent the fused band, and to smooth this out, the assembly may be treated subsequently by the method illustrated in Fig. 1.

Figure 5:
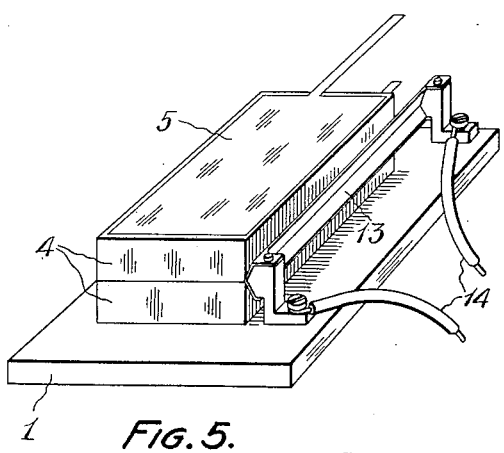
Fig. 5 represents a device employing a fixed or stationary tool adapted to fuse the whole length of the joint at once. For purposes of illustration the electrodes and crystal plates of Figs. 2 and 5 are shown as having greater thicknesses than are usually employed in piezo-electric apparatus.

Fig. 5 illustrates another modification in which the material adjacent the joint may be fused without treating the whole surface. In this modification a heated tool 13 is rigidly fixed upon a support 1 at such a height that its working face will contact the joint between two crystalline plates 1, 1 as shown. The tool 13 may consist of a solid bar or merely a hollow tube or bent plate, but in any case it is adapted to be heated by some appropriate means. This may be done, for example, by making the tool 13 a resistance element in an electric circuit, 14. Where a heavy tool is used which, by reason of its large cross-section, has too low a resistance to be used in the above manner, it may be made hollow and heated internally with gas or by an electric resistance coil inserted therein. Whatever means are used, the tool should be heated substantially above the melting point of the crystalline material to be fused. An assmbly of crystalline bodies, such as that shown in Fig. 5 may then be forced up against the tool for a moment or two and then retracted so that the fused salt may be allowed to solidify. Such a device is convenient when making large quantities of a particular assembly. Of course, the height of tool 13 may be made adjustable to accommodate it to use with bodies of various thicknesses. Furthermore, instead of being fixed, tool 13 may be movably mounted so that it may be forced against the crystals instead of forcing the crystals against it.

Other mechanical modifications may be made without departing from the invention as defined in the following claims. Furthermore, the invention may be practised with many readily fusible crystalline materials besides Rochelle salt. For example, such piezo-electric materials as benzil and the various organic salts which are insomorphous with Rochelle salt have thermal properties which permit them to be united by means of the method here disclosed.

Having now explained the invention, what I claim is:

1. An assembly for use in piezo-electric devices comprising at least two crystalline bodies of readily fusible piezo-electric material integrally joined together through a solidified autogenous joint.

2. A unit as claimed in claim 1 wherein said piezo-electric material comprises Rochelle salt.

3. A piezo-electric unit comprising a plurality of crystalline plates of Rochelle salt disposed in face to face arrangement, said plates being integrally united at their edges through a solidified autogenous joint.

4. A piezo-electric unit comprising a pair of crystalline bodies of readily fusible piezo-electric material disposed on opposite sides of an electrode and integrally joined together through a solidified autogenous joint disposed beyond the edge of said electrode.

5. A pizo-electric unit comprising a pair of crystalline bodies of readily fusible piezo-electric material spaced from each other by an electrode and integrally joined together through a solidified autogenous joint disposed adjacent the edge of said electrode.

6. The method of making a composite piezo-electric unit which comprises the steps of providing a pair of bodies composed of readily fusible piezo-electric material, each of said bodies being provided with an electrode face, disposing said pair of bodies in face to face relationship with a relatively thin layer of electrode material positioned therebetween, melting adjacent surface portions of said bodies which lie beyond the edge of said electrode material thereby forming a fluid bond between sad bodies, and thereafter solidifying said fluid material whereby said bodies are integrally united through an autogenous joint.

7. The method of making a composite piezo-electric unit which comprises the steps of providing a pair of bodies composed of readily fusible piezo-electric material, each of said bodies being provided with an electrode face, disposing said pair of bodies in face to face relationship with a relatively thin layer of electrode material positioned therebetween, melting adjacent surface portions of said bodies which lie beyond the edge of said electrode material by applying thereto a tool heated substantially above the melting point of said piezo-electric material thereby forming a fluid bond between said bodies, and thereafter solodifying said fluid material, whereby said bodies are integrally united through an outogenous joint.

PAUL PFUNDT.